US012626959B2

(12) United States Patent
Hwang et al.

(10) Patent No.: US 12,626,959 B2
(45) Date of Patent: May 12, 2026

(54) CARBON-CERAMIC COMPOSITES, ELECTRODE COMPRISING THE SAME AND SECONDARY BATTERY COMPRISING THE ELECTRODE

(71) Applicant: SK On Co., Ltd., Seoul (KR)

(72) Inventors: Chang Mook Hwang, Daejeon (KR); Jong Hyeok Lee, Daejeon (KR); Yoon Ji Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 610 days.

(21) Appl. No.: 18/088,392

(22) Filed: Dec. 23, 2022

(65) Prior Publication Data

US 2023/0327085 A1 Oct. 12, 2023

(30) Foreign Application Priority Data

Apr. 7, 2022 (KR) .......................... 10-2022-0043480

(51) Int. Cl.
*H01M 10/42* (2006.01)
*H01M 4/02* (2006.01)
*H01M 4/36* (2006.01)
*H01M 4/48* (2010.01)
*H01M 4/587* (2010.01)

(52) U.S. Cl.
CPC ....... *H01M 10/4235* (2013.01); *H01M 4/366* (2013.01); *H01M 4/483* (2013.01); *H01M 4/587* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2012/0231161 A1 9/2012 Gimvang
2017/0170515 A1* 6/2017 Yushin .................. H01M 4/582
(Continued)

FOREIGN PATENT DOCUMENTS

CN 106477605 A * 3/2017
CN 113745483 A 12/2021
JP 2016-115553 A 6/2016
(Continued)

OTHER PUBLICATIONS

CN-106477605-A English Machine Translation (Year: 2015).*
(Continued)

*Primary Examiner* — Scott J. Chmielecki
(74) *Attorney, Agent, or Firm* — IP & T GROUP LLP

(57) ABSTRACT
The present disclosure relates to a ceramic-carbon composite including a ceramic shell surrounding a hollow portion; and a carbon coating layer surrounding the ceramic shell, wherein the hollow portion is in a vacuum state, an electrode including the ceramic-carbon composite, and a secondary battery including the electrode. The ceramic-carbon composite of the present disclosure has excellent thermal barrier effect and electrical conductivity, and thus, when used in the electrode, non-ideal heat transfer between an electrode active material and an electrode current collector is blocked to prevent a thermal runaway phenomenon, to have an effect that can significantly improve safety of the secondary battery.

17 Claims, 1 Drawing Sheet

(56) References Cited

U.S. PATENT DOCUMENTS

| | | | |
|---|---|---|---|
| 2018/0316018 A1 | 11/2018 | Ohsawa et al. | |
| 2020/0343580 A1* | 10/2020 | Yushin | ............... H01M 10/0565 |

FOREIGN PATENT DOCUMENTS

| | | |
|---|---|---|
| KR | 10-2006-0124036 A | 12/2006 |
| KR | 10-2018-0057686 A | 5/2018 |
| KR | 10-2018-0078889 A | 7/2018 |
| KR | 10-2021-0028920 A | 3/2021 |

OTHER PUBLICATIONS

Liu Panxing et al., "Synthesis and characterization of hollow Si-SIC composite nanospheres from hollow Si02/C nanospheres", Journal of Sol-Gel Science Andtechnology, vol. 73, No. 1, Nov. 14, 2014 (Nov. 14, 2014), pp. 270-277, Springer, New York, US.
Extended European Search Report on the European Patent Application No. 22216695.1 issued by the European Patent Office on Aug. 29, 2023.
Office Action for Korean Patent Application No. 10-2022-0043480 issued by the Korean Patent Office on Nov. 6, 2024.

* cited by examiner

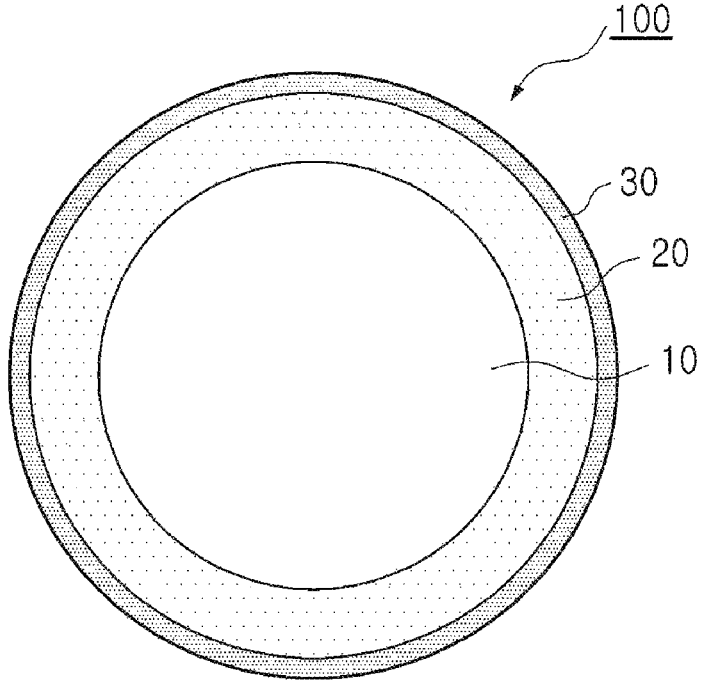

CARBON-CERAMIC COMPOSITES, ELECTRODE COMPRISING THE SAME AND SECONDARY BATTERY COMPRISING THE ELECTRODE

CROSS-REFERENCE TO RELATED APPLICATION(S)

This application claims benefit of priority to Korean Patent Application No. 10-2022-0043480 filed on Apr. 7, 2022 in the Korean Intellectual Property Office, the disclosure of which is incorporated herein by reference in its entirety.

BACKGROUND

1. Field

The present disclosure relates to a secondary battery having improved safety, and more particularly, a ceramic-carbon composite, a method for fabricating the same, an electrode including the same, and a secondary battery including the electrode.

2. Description of Related Art

As a driving power source for mobile information terminals such as a mobile phone, a notebook computer, a smartphone, and the like, a lithium secondary battery having a high energy density and being easy to carry is mainly used. In addition, recent research has been actively conducted to use such a lithium secondary battery as a driving power source or a power storage power source for a hybrid vehicle or a battery-powered vehicle by using the characteristic of high energy density. A large number of secondary batteries may be electrically connected to increase capacity and output.

One of the main research tasks in the lithium secondary battery is to improve safety of the secondary battery. In particular, when a thermal runaway phenomenon occurs due to heat generated in a decomposition reaction of an active material, excessive current may occur due to damage to a separator, while a short circuit between positive and negative electrodes, or an internal short circuit may also occur, which may cause fire or an explosion.

In addition, in a medium-to-large device in which a plurality of lithium secondary batteries are electrically connected, such as an electric vehicle or the like, a thermal runaway phenomenon generated in a unit cell may affect adjacent unit cells, and accordingly, heat transfer to an entirety of a module or a pack may ensue.

As such, since the thermal runaway phenomenon may inflict fatal damage to users, in addition to damage to the lithium secondary battery, it is necessary to develop a technology capable of improving safety of the lithium secondary battery.

SUMMARY

The present disclosure is provided to solve the above problems, and to prevent instantaneous heat transfer between an electrode active material and an electrode current collector, even when non-ideal heat is generated from the electrode active material, which is a trigger point of a thermal runaway phenomenon. To this end, as an embodiment, a ceramic-carbon composite, a method for fabricating the same, an electrode including the ceramic-carbon composite, and a secondary battery including the electrode are provided.

According to an aspect of the present disclosure, a ceramic-carbon composite includes a ceramic shell surrounding a hollow portion; and a carbon coating layer surrounding the ceramic shell, wherein the hollow portion is in a vacuum state.

The ceramic shell may include at least one selected from the group consisting of $Al_2O_3$, $SiO_2$, $ZrO_2$, and SiC.

The ceramic shell may have an average thickness of 1 nm to 1 $\mu$m.

The carbon coating layer may have an average thickness of 1 nm to 1 $\mu$m.

The ceramic-carbon composite may have a diameter of 10 nm to 5 $\mu$m.

The ceramic-carbon composite may have a compressive strength of 30 to 50 MPa.

According to an aspect of the present disclosure, an electrode includes an electrode current collector; a first layer formed on at least one surface of the electrode current collector; and a second layer formed on the first layer and including an electrode mixture layer including an electrode active material, wherein the first layer includes a ceramic-carbon composite including a ceramic shell surrounding a hollow portion and a carbon coating layer surrounding the ceramic shell, wherein the hollow portion is in a vacuum state.

The first layer may further include a binder.

The first layer may include 90 to 99 wt % of the ceramic-carbon composite and 1 to 10 wt % of the binder.

The first layer may have a thickness of 1 to 10 $\mu$m.

The electrode may be a positive electrode or a negative electrode.

According to an aspect of the present disclosure, provided is a secondary battery including an electrode.

According to an aspect of the present disclosure, a method for fabricating a ceramic-carbon composite includes heating a first ceramic powder at a temperature of 1800 to 2200° C.; preparing a first mixture by mixing the first ceramic powder with a porous second ceramic powder or water; preparing a second mixture by mixing the first mixture with a curable resin and a carbon material; and evacuating the second mixture in a vacuum.

The first ceramic powder and the second ceramic powder may independently include at least one selected from the group consisting of $Al_2O_3$, $SiO_2$, $ZrO_2$, and SiC.

The method may further include pulverizing the first mixture.

The method may further include removing metal impurities using magnetic force, after the pulverizing the first mixture.

In the method, an average particle size of the first mixture may be 1/5 to 4/5 of an average particle size of an electrode active material.

In the method, an average particle size of the first mixture may be 10 nm to 5 $\mu$m of the electrode active material.

The curable resin may be added in an amount of 1 to 15 wt %, based on a total weight of a solid content of the second mixture.

The carbon material may be added in an amount of 5 to 30 wt %, based on a total weight of a solid content of the second mixture.

The preparing a second mixture may be performed by additionally adding 0.001 to 5 wt % of a curing accelerator, based on a total weight of a solid content of the second mixture.

The evacuating the second mixture in a vacuum may be performed at a vacuum degree of 0 to 760 mmHg and under an ultrasonic condition of 1000 to 5000 Hz.

The method may further include curing the second mixture evacuated in a vacuum at a temperature of 150 to 300° C.

According to an aspect of the present disclosure, a method for fabricating an electrode includes providing an electrode current collector; applying a first slurry including the ceramic-carbon composite on at least one surface of the electrode current collector; applying a second slurry including an electrode active material and a binder on the first slurry; and drying and rolling the electrode current collector to which the first slurry and the second slurry are applied.

The first slurry may further include a binder in an amount of 1 to 10 wt %, based on a total weight of the first slurry.

BRIEF DESCRIPTION OF DRAWINGS

The above and other aspects, features, and advantages of the present disclosure will be more clearly understood from the following detailed description, taken in conjunction with the accompanying drawings, in which:

FIG. 1 schematically illustrates a ceramic-carbon composite according to an embodiment of the present disclosure.

DETAILED DESCRIPTION

Hereinafter, preferred embodiments of the present disclosure will be described with reference to various examples. However, embodiments of the present disclosure may be modified to have various other forms, and the scope of the present disclosure is not limited to embodiments described below.

According to an aspect of the present disclosure, a ceramic-carbon composite may be provided. A ceramic-carbon composite 100 is schematically illustrated in FIG. 1. As illustrated in FIG. 1, the ceramic-carbon composite 100 may include a ceramic shell 20 surrounding a hollow portion 10 and a carbon coating layer 30 surrounding the ceramic shell 20.

The ceramic-carbon composite 100 may have a core-shell structure in which an inner core is hollow, and the hollow portion 10 may be formed to have a vacuum. As described above, as the hollow portion 10 is formed to have a vacuum, excellent thermal insulation and heat resistance may be exhibited.

The ceramic shell 20 surrounding the hollow portion 10 may include at least one selected from the group consisting of $Al_2O_3$, $SiO_2$, $ZrO_2$, and SiC. The ceramic shell 20 may have high strength, and may seal the hollow portion 10 to maintain the vacuum within the hollow portion 10.

An average thickness of the ceramic shell 20 may be 1 nm to 1 μm. When the average thickness of the ceramic shell 20 is less than 1 nm and the hollow portion 10 is formed to have a vacuum, durability of the ceramic shell may not be ensured, and when the average thickness of the ceramic shell 20 exceeds 1 μm, a size of the hollow portion 10 may be small and the hollow portion 10 may not provide sufficient thermal insulation and heat resistance.

The carbon coating layer 30 may be formed on the ceramic shell 20, and the carbon coating layer 30 may be provided to form a second shell surrounding the ceramic shell 20. A ceramic-carbon composite 100 according to an embodiment may include the carbon coating layer 30 formed of a carbon material on the ceramic shell 20, to improve electrical conductivity.

An average thickness of the carbon coating layer 30 may be 1 nm to 1 μm. When the average thickness of the carbon coating layer 30 is less than 1 nm, sufficient conductivity may not be ensured, and when the average thickness of the carbon coating layer 30 exceeds 1 μm, the carbon coating layer may be excessively thick, as compared to the ceramic shell, and an effect of the hollow portion 10 in a vacuum state may not be obtained.

The ceramic-carbon composite 100 may have a diameter of 10 nm to 5 μm. When the diameter of the ceramic-carbon composite 100 is less than 10 nm, a problem may occur in a process of coating the ceramic shell 20, and when the diameter of the ceramic-carbon composite 100 exceeds 5 μm, conductivity may be rather inhibited due to the hollow portion, and contacting an active material with an electrode current collector may be prevented to reduce adhesiveness.

The ceramic-carbon composite 100 may have a compressive strength of 30 to 50 MPa. When the compressive strength of the ceramic-carbon composite is less than 30 MPa, the ceramic layer may not secure sufficient strength to release the vacuum of the hollow portion by external pressure, and when the compressive strength of the ceramic-carbon composite exceeds 50 MPa, a substrate such as an active material, a foil, or the like may be damaged. As will be described later, since the ceramic-carbon composite 100 may be used as a primer layer of a secondary battery, it is preferable to have high strength that may not be damaged in a rolling process.

The ceramic-carbon composite may be prepared as follows. Specifically, according to another aspect of the present disclosure, a method for fabricating a ceramic-carbon composite, including heating a first ceramic powder, cooling the heated first ceramic powder, preparing a first mixture by mixing the cooled first ceramic powder with a porous second ceramic powder or water, preparing a second mixture by mixing the first mixture with a curable resin and a carbon material, and evacuating the second mixture in a vacuum, may be provided.

First, heating a first ceramic powder at a temperature of 1800 to 2200° C. may be performed. By heating the first ceramic powder at a temperature of 1800 to 2200° C., the first ceramic powder may be prepared as a single crystal to secure strength of the powder.

When the strength of the first ceramic powder is low, as a fracture may occur due to an external force such as rolling or the like, a hollow portion in a vacuum state may not be formed.

When the heat temperature is less than 1800° C., a grain boundary may be formed such that a pore and impurities are easily formed to reduce strength to about 50 to 70%, as compared to the single crystal. When the heat temperature exceeds 2200° C., a change rate in a specific volume may be rapidly changed to increase the specific volume.

As necessary, cooling the heated first ceramic powder may be performed. The cooling is not particularly limited, but after pouring the heated first ceramic powder into a mold, natural cooling, air cooling or water cooling the same may be performed, and the cooling may be performed at a temperature of 10 to 45° C.

Preparing a first mixture by mixing the cooled first ceramic powder with a porous second ceramic powder or water, may be performed, as described above. In a subsequent process, the porous second ceramic powder or water may form a pore, and may form a hollow portion having a vacuum therein by a process of evacuating the same.

The porous second ceramic powder may be identical to or different from the first ceramic powder. For example, the porous second ceramic powder may include at least one selected from the group consisting of $Al_2O_3$, $SiO_2$, $ZrO_2$, and SiC.

The ceramic-carbon composite provided in the present embodiment may be used to form a primer layer disposed on an upper surface of an electrode current collector and a lower surface of an electrode mixture layer, and to improve adhesion and maintain a vacuum degree of the hollow portion, an average particle size of the first mixture of the first ceramic powder and the porous second ceramic powder may be ⅕ to ⅘, specifically ⅖ to ⅗ of an average particle size of an electrode active material. When the average particle size of the first mixture is less than ⅕ of the average particle size of the electrode active material, the hollow portion may not exert an effect according to the vacuum state, and when the average particle size of the first mixture exceeds ⅘ of the average particle size of the electrode active material, there may be problems in adhesion and electrical conductivity in an electrode.

More specifically, the average particle size of the first mixture may be 10 nm to 5 μm.

To have the above average particle size, pulverizing the first mixture may be further included, and as necessary, after the pulverizing, sieving the pulverized first mixture may be further included. The pulverizing may be performed in various manners, such as a ball mill, a jet mill, or the like, and specifically may be performed using a ball mill.

After the pulverizing the first mixture, removing metal impurities using magnetic force may be further included. In particular, when the pulverizing is performed using a ball mill, the metal impurities may be generated during the pulverizing, and the metal impurities may be removed by using the magnetic force.

The sieving is not particularly limited, and may be performed in a manner generally performed in the art. For example, the sieving may be performed by passing a mesh or using a vibrating screen.

Next, preparing a second mixture by mixing the first mixture with a curable resin and a carbon material may be performed.

The curable resin may be a thermosetting resin such as a phenol resin, a urea resin, a melamine resin, an unsaturated polyester resin, an epoxy resin, a polyurethane resin, a polyimide resin, or the like, and the curable resin may be added in an amount of 1 to 15 wt %, based on a total weight of a solid content of the second mixture. When the amount of the curable resin is less than 1 wt %, there may be a problem that the second mixture may not be sufficiently cured, and when the amount of the curable resin exceeds 15 wt %, the curable resin may remain to cause a side reaction with an electrolyte solution.

The carbon material may be added to form a carbon coating layer of the ceramic-carbon composite prepared according to the present disclosure, to improve electrical conductivity. The carbon material is not particularly limited, but may be, for example, carbon black.

The carbon material may be added in an amount of 5 to 30 wt %, based on the total weight of the solid content of the second mixture. When the amount of the carbon material is less than 5 wt %, conductivity may not be sufficiently secured, and when the amount of the carbon material exceeds 30 wt %, there may be problems that conductivity may not increase any more, but rather an overall volume increases.

In addition, the preparing a second mixture may be performed by additionally adding a curing accelerator. The curing accelerator may use, for example, benzoyl peroxide, cyclohexanone peroxide, lauroyl peroxide, or the like. Not to cause a change in properties, the curing accelerator may be added in an amount of 0.001 to 5 wt %, based on the total weight of the solid content of the second mixture.

Next, evacuating the second mixture in a vacuum may be performed. The evacuating the second mixture in a vacuum may be performed, for example, at a vacuum degree of 0 to 760 mmHg, and may be performed under an ultrasonic condition of 1000 to 5000 Hz. In particular, when carried out under an ultrasonic vacuum condition, as described above, it is possible to increase a vacuum rate and effectively remove bubbles therein.

The evacuating the second mixture in a vacuum may be performed in a step-by-step manner.

For example, after performing the evacuating for 10 minutes to 2 hours in a high vacuum condition of $10^{-3}$ mmHg to $10^{-7}$ mmHg, the evacuating may be performed for 30 to 4 hours in an intermediate vacuum condition of 1 mmHg to $10^{-3}$ mmHg. Performing the evacuating in a step-by-step manner as described above may be more effective than performing the evacuating in a continuous manner. In performing the evacuating in a step-by-step manner, there may be a rest period of about 5 to 10 seconds between steps of the evacuating in a step-by-step manner for stabilization.

The second mixture evacuated in a vacuum may be cured at a temperature of 150 to 300° C. to obtain the ceramic-carbon composite. As described above, a ceramic-carbon composite according to the present disclosure may include a ceramic shell surrounding a hollow portion; and a carbon coating layer surrounding the ceramic shell, wherein the hollow portion is in a vacuum state. As described above, as the hollow portion is formed to have a vacuum, excellent thermal insulation and heat resistance may be exhibited, and the ceramic shell formed using a ceramic powder as a single crystal may exhibit high strength. In addition, the carbon coating layer may be included on a surface of the ceramic shell to further secure electrical conductivity.

According to another aspect of the present disclosure, an electrode including the ceramic-carbon composite and a method for fabricating the same may be provided. More specifically, a method for fabricating an electrode includes providing an electrode current collector; applying a first slurry including the ceramic-carbon composite on at least one surface of the electrode current collector to form a first layer; applying a second slurry including an electrode active material and a binder on the first layer to form a second layer; and drying and rolling the first layer and the second layer.

In an electrode according to the present disclosure, a first slurry for forming a primer layer as a first layer on an electrode current collector may further include a binder to improve adhesion of a ceramic-carbon composite. The binder may be included in an amount of 1 to 10 wt %, based on a total weight of a solid content of the first slurry forming the primer layer. In this case, the solid content included in the first slurry may be the ceramic-carbon composite and the binder, and thus, the ceramic-carbon composite may have an amount of 90 to 99 wt %.

The binder is not particularly limited, and for example, polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, a styrene butadiene rubber, a fluoro rubber, various copolymers, or the like may be used, and polyvinylidene fluoride may be preferably used.

The first slurry may include a solvent. The solvent may be a conventional solvent used for preparation of an electrode, and may be an aqueous solvent or a non-aqueous solvent, but is not particularly limited.

The second slurry applied on the first layer from the first slurry may form an electrode mixture layer as a second layer, and the second layer may include an electrode active material and a binder. In addition, as necessary, to improve electrical conductivity, the second slurry may further include a conductive material.

A coating process using a slot die may be used for application of the first and second slurries, and in addition, a Mayer bar coating process, a gravure coating process, an immersion coating process, a spray coating process, or the like may be used. It is preferred to use a spray coating process that is advantageous for mass-production application, since the slurries may be in close contact with a substrate by a strong pressure to secure high adhesion therebetween, and the process may be relatively easily applied thereto.

Drying and rolling the electrode current collector to which the first slurry and the second slurry are applied may be performed in a method generally used in the art, but are not particularly limited. For example, drying may be performed, for example, in a dry atmosphere at room temperature or the like, and after the drying, rolling may be performed by passing the electrode current collector through a metal rolling roll of a calendering device.

In the drying, the first slurry may be applied and dried to form a first layer, and after forming the first layer, the second slurry may be applied and dried to form a second layer. In performing a separate drying process as described above, a migration phenomenon in which a binder moves to a surface during the drying process may be suppressed.

The first slurry and the second slurry may be applied continuously or with a predetermined time difference, and then dried at the same time to form the first layer and the second layer. In drying at the same time in this manner, the drying may be performed only once, such that the process may be simplified.

According to the present disclosure, an electrode includes an electrode current collector, a primer layer formed on at least one surface of the electrode current collector, and an electrode mixture layer formed on the primer layer, wherein the primer layer includes a ceramic-carbon composite including a ceramic shell surrounding a hollow portion; and a carbon coating layer surrounding the ceramic shell, wherein the hollow portion is in a vacuum state.

A thickness of a first layer, the primer layer including the ceramic-carbon composite, may be 1 to 10 μm. When the thickness of the first layer is less than 1 μm, an amount of the ceramic-carbon composite may be too small to obtain an effect of improving safety due to prevention of thermal runaway, and when the thickness of the first layer exceeds 10 μm, safety may be improved, but battery performance such as battery life characteristics or the like may be excessively affected.

The electrode may be a positive electrode or a negative electrode. As the positive electrode and the negative electrode, any positive electrode and negative electrode, recognized in the art, may be applied without limitation.

For example, in the positive electrode, a positive electrode current collector is not particularly limited, but a thin plate formed of aluminum, stainless steel, or nickel may be used, and it is preferable to use a thin plate formed of aluminum. In addition, a porous body such as a mesh or a mesh-like material may be used, and may be coated with an oxidation-resistant metal or an alloy film, to prevent oxidation.

A positive electrode active material may be a compound capable of effectuating reversible intercalation and deintercalation of lithium, and specifically, a lithium transition metal composite oxide containing lithium and at least one transition metal selected from the group consisting of nickel, cobalt, manganese, and aluminum, preferably a lithium transition metal composite oxide containing lithium and a transition metal containing nickel, cobalt, and manganese.

A binder may be further included to improve binding of an active material, a conductive material, or the like, and adhesion to the current collector, and specifically, such a binder may include at least one selected from the group consisting of polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, a styrene butadiene rubber and a fluoro rubber, preferably polyvinylidene fluoride.

The positive electrode may further include at least one conductive material selected from the group consisting of graphite, carbon black, carbon nanotubes, a metal powder, and a conductive oxide, to improve conductivity.

In the negative electrode, a negative electrode current collector is not particularly limited as long as it has conductivity without causing a chemical change in a battery including the same. For example, copper, stainless steel, aluminum, nickel, titanium, calcined carbon, copper, a material in which stainless steel is surface-treated with carbon, nickel, titanium, silver, or the like, an aluminum-cadmium alloy, or the like may be used. In addition, in a similar manner to the positive electrode current collector, a bonding force of a negative electrode active material may be strengthened by forming fine irregularities on a surface of the negative electrode current collector, and may be used in various forms such as a film, a sheet, a foil, a net, a porous body, a foam, a non-woven body, or the like.

The negative electrode active material may be a silicon-based negative electrode active material and a carbon-based negative electrode active material. Although not particularly limited, the silicon-based negative active material may use at least one selected from the group consisting of $SiO_x$ (0<x<2) particles, a Si—C composite, and a Si—Y alloy (where Y is at least one selected from the group consisting of an alkali metal, an alkaline earth metal, a transition metal, a group 13 element, a group 14 element, a rare earth element, and combinations thereof), for example, $SiO_x$. The carbon-based negative active material may be, for example, at least one selected from the group consisting of artificial graphite, natural graphite, and graphitized mesocarbon microbeads, specifically artificial graphite.

A negative electrode mixture layer may also include a binder and a conductive material. The binder may include an aqueous binder and a rubber-based binder.

The aqueous binder may be soluble in an aqueous solvent such as water or the like, and may include at least one selected from the group consisting of polyvinyl alcohol (PVA), polyacrylic acid (PAA), polyethylene glycol (PEG), polyacrylonitrile (PAN), polyacrylamide (PAM), and carboxylmethyl cellulose (CMC).

The rubber-based binder may not be easily soluble in an aqueous solvent such as water or the like, but may be defined as being able to be smoothly dispersed in the aqueous solvent. Specifically, the rubber-based binder may include at least one selected from styrene butadiene rubber (SBR), hydrogenated nitrile butadiene rubber (HNBR), acrylonitrile butadiene rubber, acrylic rubber, butyl rubber (butyl rubber), and fluoro rubber, more specifically, at least one selected from the group consisting of styrene-butadiene rubber and hydrogenated nitrile-butadiene rubber in terms of easy dispersion and excellent phase stability, more preferably styrene-butadiene rubber.

The conductive material may use at least one selected from the group consisting of graphite, carbon black, a carbon nanotube, a metal powder, and a conductive oxide.

According to another aspect of the present disclosure, a secondary battery including the electrode described above may be provided. As described above, in a secondary battery according to the present disclosure, safety against thermal runaway may be greatly improved, and, thus, a product to be mounted and safety of a user may be guaranteed.

A secondary battery module may be configured using a secondary battery according to the present disclosure as a unit cell, and the module may be provided as one or more modules, and the one or more modules may be packaged in a pack case to form a secondary battery pack. The secondary battery module and secondary battery pack including the same, described above, may be applied to various devices. Such devices may be applied to transportation means such as an electric bicycle, an electric vehicle, a hybrid vehicle, or the like, but the present disclosure is not limited thereto, and may be applied to various devices that may use the secondary battery module and secondary battery pack including the same, described above, which may also fall within the scope of the present disclosure.

EXAMPLE

Hereinafter, the present disclosure will be described in more detail through specific examples. The following examples are illustrative only to help in an understanding of the present disclosure, and the scope of the present disclosure is not limited thereto.

Preparation Example: Preparation of Ceramic-Carbon Composite

As a first ceramic powder, 500 g of $Al_2O_3$ having an average particle size of 100 μm was heated at a temperature of 1900° C. for 180 minutes to obtain a heated ceramic powder, and the heated ceramic powder was cooled to 25° C.

The first ceramic powder cooled was mixed with 500 g of $SiO_2$ as a porous second ceramic powder, and water, to prepare a mixture, and the prepared mixture was then pulverized by a ball mill process for 180 minutes, to obtain a powder having an average particle size of 0.5 μm.

To the pulverized powder, 50 g of polyurethane as a curable resin was added, and 100 g of carbon black as a carbon material was added, to prepare a mixture.

The prepared mixture was evacuated for 1 hour at a vacuum degree of $10^{-5}$ mmHg and under an ultrasonic vacuum condition 3000 Hz, and then evacuated for 2 hours at a vacuum degree of $10^{-1}$ mmHg and under an ultrasonic vacuum condition of 3000 Hz.

The evacuated mixture was cured at a temperature of 180° C. to prepare a ceramic-carbon composite.

Comparative Example 1

97.3 wt % of NCM622 as a positive electrode active material, 1.5 wt % of PVDF as a binder, and 1.2 wt % of carbon black as a conductive material were mixed, and distilled water was added, to prepare a positive electrode mixture slurry having a solid content of 55%.

The prepared positive electrode mixture slurry was applied to both surfaces of a 10 μm aluminum foil as a positive electrode current collector, dried and then rolled, to prepare a positive electrode having an electrode thickness of 80 μm.

96 wt % of artificial graphite as a negative electrode active material, 1.8 wt % of styrene-butadiene rubber and 1.2 wt % of carboxymethyl cellulose as a binder, and 1 wt % of carbon black as a conductive material were mixed, and distilled water was added, to prepare a negative electrode mixture slurry having a solid content of 50%.

The negative electrode mixture slurry was applied to both surfaces of a copper foil (10 μm in thickness), dried and then rolled, to prepare a negative electrode having an electrode thickness of 80 μm.

The positive electrode and the negative electrode were alternately stacked in an amount of 5 sheets each with a separator as a boundary, to prepare an electrode assembly, the electrode assembly was inserted into a pouch case, and the pouch case was sealed to prepare a pouch battery.

Examples 1 to 4, and Comparative Example 1

The prepared ceramic-carbon composite and a binder were mixed in a weight ratio of 93:7, and water was added such that a solid content was 60%, to prepare a primer coating slurry.

The primer coating slurry was applied to both surfaces of an aluminum foil as a positive electrode current collector, identical to those as in Comparative Example 1, and both surfaces of a copper foil as a negative electrode current collector, identical to those as in Comparative Example 1, respectively, to form a primer layer as a first layer.

As illustrated in Table 1, a thickness of the primer layer was formed for the negative electrode current collector and the positive electrode current collector, respectively, to be 1 μm (Example 1), 5 μm (Example 2), 10 μm (Example 3), and 20 μm (Example 4), as the same thickness.

A negative electrode and a positive electrode were prepared by using the positive electrode mixture slurry and the negative electrode mixture slurry in the same manner as in Comparative Example 1, except that the current collector having each primer layer was used, and a pouch battery was prepared.

Battery Performance Evaluation

For each of the prepared pouch batteries, conduction resistance, cell capacity, cell resistance, rapid charging time, lifespan, an external maximum temperature of a cell in internal short circuit TP (thermal runaway transfer), and an ignition time of an adjacent cell in overcharging by 1.5 times were measured, respectively, and measurement results therefrom were illustrated in Table 1 below.

Measurement methods of the performance evaluation items of the battery were as follows.

(1) Electrode Conduction Resistance

Five (5) electrodes were stacked, and resistance generated by applying a constant current from a top electrode to a bottom electrode was measured by an electrode conduction resistance meter.

(2) Cell Capacity

Charging: CCCV 4.2 V 1 C-rate 0.05 C-cut-off
Rest: 10 minutes
Discharging: CC 1 C-rate 2.5 V cut-off
Rest: 10 minutes
Last discharging capacity after repeating the above process 3 times

(3) Cell Resistance

Charging: CCCV 4.2 V 1 C-rate 0.05 C-cut-off
Rest: 10 minutes
Discharging: CC 1 C-rate 2.5 V cut-off
Rest: 10 minutes
Repeat the above process 3 times
Charging: CCCV 4.2 V 1 C-rate 0.05 C-cut-off
Rest: 10 minutes
Discharging: CC 1C-rate SOC 50% cut-off
Rest: 10 minutes
Discharging resistance: CC 4 C-rate 10 sec cut-off

(4) Rapid Charging Time

Charging was performed by processes of SOC 0 setting→CCCV 3 C-rate SOC 50% charging→CCCV 2 C-rate SOC 70% charging→CCCV 1 C-rate SOC 80% charging, and a time taken to fully charge was measured. At this time, the higher the resistance, the longer the charging time.

(5) Lifespan

After repeating charging (CC-CV 0.3 C 4.2V 0.05 C CUT-OFF) and discharging (CC 0.3 C 2.5V CUT-OFF) 500 times, discharging capacity at 500 times as a percentage, relative to one-time discharging capacity, was calculated to determine a room temperature lifespan characteristic.

(6) External Maximum Temperature of Cell in Internal Short Circuit

In a process of testing safety by contacting the positive electrode and the negative electrode to cause a short circuit, the secondary battery was locally pressurized from an outside of the cell to effectuate short circuit, and a temperature at this time was measured.

(7) Thermal Runaway Transfer Time

The secondary battery cell was overcharged by 1.5 times, and an ignition time of adjacent cell was measured.

electrodes in which the primer layer including the ceramic-carbon composite is formed on the electrode current collector has improved.

Specifically, it was found that, in Example 1, an external maximum temperature of a cell in internal short circuit and a thermal runaway transfer time were significantly improved to increase safety, without affecting cell performance (electrode conduction resistance, cell capacity, cell resistance, fast charging time, and lifespan), as compared to Comparative Example 1.

In addition, it was evaluated that, in Examples 2 and 3, as a result of evaluation of cell capacity and cell resistance, there was a slight decrease in cell performance, but it was not only a sufficiently mountable level, but also safety was greatly improved. In particular, in Example 3, it can be confirmed that a thermal runaway transfer time was significantly improved to be 10 minutes.

Example 4 was a case in which the primer layer was thickly formed to have a thickness of 20 μm. In this case, it was found that a rapid charging time was increased and a lifespan was decreased, but an external maximum temperature of the cell was remarkably low at 90° C. in an internal short circuit, a thermal runaway transfer time was significantly improved to be 20 minutes, and safety of the battery was significantly improved even in a thermal runaway situation.

It is said that an effect of the present disclosure is a remarkable result, considering that it is necessary to strengthen safety of a medium-to-large device such as an electric vehicle or the like, rapidly increasing in recent years.

A ceramic-carbon composite of the present disclosure has an excellent thermal barrier effect and excellent electrical conductivity, and thus, when used in an electrode, non-ideal heat transfer between an electrode active material and an electrode current collector may be blocked to prevent a thermal runaway phenomenon, to have an effect that can significantly improve safety of the secondary battery.

While example embodiments have been illustrated and described above, it will be apparent to those skilled in the art that modifications and variations could be made without departing from the scope of the present disclosure as defined by the appended claims.

What is claimed is:

1. A ceramic-carbon composite comprising:
a ceramic shell surrounding a hollow portion; and
a carbon coating layer surrounding the ceramic shell,
wherein the hollow portion is in a vacuum state.

2. The ceramic-carbon composite of claim 1, wherein the ceramic shell comprises at least one selected from the group consisting of $Al_2O_3$, $SiO_2$, $ZrO_2$, and SiC.

TABLE 1

| | Primer Layer Thickness (μm) | Electrode Conduction Resistance (Ω) | Cell Capacity (Ah) | Cell Resistance (mΩ) | Rapid Charging Time (10~80% SOC) | Lifespan (cycle) | External Max. Temp. of Cell in Internal Short Circuit | Thermal Runaway Transfer Time |
|---|---|---|---|---|---|---|---|---|
| Comparative Example 1 | None | 5 | 100 | 1.0 | 20 min | 1000 | 150° C. | 2 min |
| Example 1 | 1 | 5 | 100 | 1.0 | 21 min | 1000 | 140° C. | 3 min |
| Example 2 | 5 | 5.1 | 99 | 1.02 | 24 min | 950 | 130° C. | 5 min |
| Example 3 | 10 | 5.3 | 98 | 1.05 | 26 min | 900 | 90° C. | 10 min |
| Example 4 | 20 | 5.6 | 95 | 1.1 | 30 min | 600 | 90° C. | 20 min |

As can be seen from Table 1, it can be confirmed that safety of the batteries according to Examples 1 to 3 using the 3. The ceramic-carbon composite of claim 1, wherein the ceramic shell has an average thickness of 1 nm to 1 μm.

4. The ceramic-carbon composite of claim 1, wherein the carbon coating layer has an average thickness of 1 nm to 1 μm.

5. The ceramic-carbon composite of claim 1, wherein the ceramic-carbon composite has a diameter of 10 nm to 5 μm.

6. The ceramic-carbon composite of claim 1, wherein the ceramic-carbon composite has a compressive strength of 30 to 50 MPa.

7. An electrode comprising:

an electrode current collector;

a first layer formed on at least one surface of the electrode current collector; and a second layer formed on the first layer and including an electrode mixture layer including an electrode active material, wherein the first layer includes a ceramic shell surrounding a hollow portion; and a carbon coating layer surrounding the ceramic shell, and wherein the hollow portion is in a vacuum state.

8. The electrode of claim 7, wherein the first layer further comprises a binder.

9. The electrode of claim 8, wherein the first layer comprises 90 to 99 wt % of the ceramic-carbon composite and 1 to 10 wt % of the binder.

10. The electrode of claim 7, wherein the first layer has a thickness of 1 to 10 μm.

11. The electrode of claim 7, wherein the electrode is a positive electrode or a negative electrode.

12. The electrode of claim 7, wherein the ceramic shell comprises at least one selected from the group consisting of $Al_2O_3$, $SiO_2$, $ZrO_2$, and SiC.

13. The electrode of claim 7, wherein the ceramic shell has an average thickness of 1 nm to 1 μm.

14. The electrode of claim 7, wherein carbon coating layer has an average thickness of 1 nm to 1 μm.

15. The electrode of claim 7, wherein ceramic-carbon composite has a diameter of 10 nm to 5 μm.

16. The electrode of claim 7, wherein ceramic-carbon composite has a compressive strength of 30 to 50 MPa.

17. A secondary battery comprising the electrode according to claim 7.

* * * * *